United States Patent [19]

Polivka et al.

[11] Patent Number: 6,001,212
[45] Date of Patent: *Dec. 14, 1999

[54] METHOD FOR LINING OF LATERAL PIPELINES WITH FLOW-THROUGH APPARATUS

[75] Inventors: Richard Carl Polivka, Lemont; David K. York, Lansing, both of Ill.

[73] Assignee: Insituform (Netherlands) B.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/622,522

[22] Filed: Mar. 25, 1996

[51] Int. Cl.⁶ .............................. B29C 63/28; B29C 63/36
[52] U.S. Cl. .......................... 156/287; 138/97; 156/294; 156/423; 264/269; 264/516
[58] Field of Search ................ 156/94, 287, 294, 156/423; 264/36, 269, 516, 36.16, 36.17, 36.22; 138/97, 98; 405/150.1, 154, 155

[56] References Cited

U.S. PATENT DOCUMENTS

| | | | |
|---|---|---|---|
| 4,434,115 | 2/1984 | Chick | 156/287 |
| 5,224,742 | 7/1993 | Ooka et al. | 138/98 |
| 5,322,653 | 6/1994 | Muller | 156/294 |
| 5,329,063 | 7/1994 | Endoh | 156/287 |
| 5,393,481 | 2/1995 | Wood | 156/287 |
| 5,439,033 | 8/1995 | Kamiyama et al. | 156/287 |
| 5,451,284 | 9/1995 | Ikeda et al. | 156/287 |
| 5,454,401 | 10/1995 | Kamiyama et al. | 156/287 |
| 5,498,389 | 3/1996 | Kamiyama et al. | 156/287 |
| 5,566,719 | 10/1996 | Kamiyama et al. | 156/287 |
| 5,706,861 | 1/1998 | Wood et al. | 156/287 |

FOREIGN PATENT DOCUMENTS

| | | | |
|---|---|---|---|
| 4207038 | 9/1993 | Germany | 156/423 |
| 290037 | 12/1986 | Japan | 264/36 |
| 63-254026 | 10/1988 | Japan | 138/97 |
| 286326 | 11/1988 | Japan | 138/97 |
| 16240 | 1/1993 | Japan | 264/516 |
| 221494 | 8/1994 | Japan | 138/97 |
| 2255609 | 11/1992 | United Kingdom | 138/97 |

OTHER PUBLICATIONS

Translation of Japan 5–16240.

*Primary Examiner*—Steven D. Maki
*Attorney, Agent, or Firm*—Cowan, Liebowitz & Latman, P.C.; Michael I. Wolfson; Lloyd G. Buchanan

[57] ABSTRACT

An apparatus for the installation of an inverted resin impregnated flexible tubular liner in a lateral passageway from a main passageway while permitting the flow of fluids through the main passageway during the installation process is provided. A cylindrical body with an opening to coincide with and interact with the lateral passageway has an expandable bladder on its outside with an opening coincident with the body opening and an elbow portion on the inside which is firmly attached at the opening. An air supply inflates the bladder. A tubular elbow is attached to a flexible hose at its proximal end, the hose having a gland for injecting fluid into the hose for inverting and curing the liner.

12 Claims, 6 Drawing Sheets

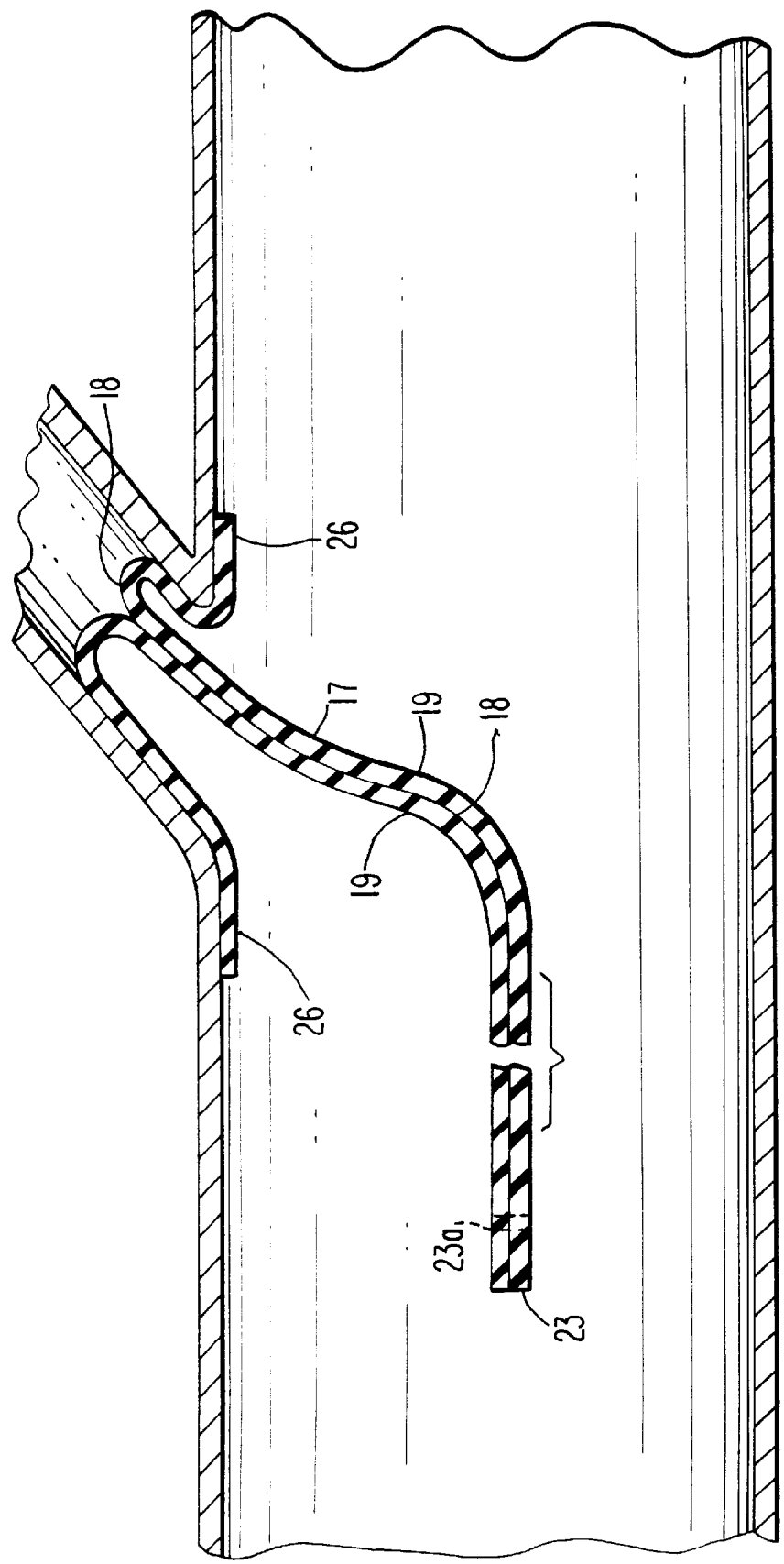

METHOD FOR LINING OF LATERAL PIPELINES WITH FLOW-THROUGH APPARATUS

BACKGROUND OF THE INVENTION

The invention relates to a method and apparatus for the installation of a cured in place liner within the interior of a conduit or pipeline, such as a sewer pipe, and, more particularly, to a method and apparatus for installation of a cured in place liner within the interior of a lateral conduit or pipeline which connects to a main conduit while maintaining flow through the main conduit or passageway during installation.

In a sewage system, a main sewer pipe will run underground directly along the line of a main street or thoroughfare, and the users of the system will be connected to the main sewer pipe by means of lateral pipes which extend transversely off the main sewer pipe to user points on opposite sides of the road, street or thoroughfare.

It is generally well known that conduits or pipelines, particularly underground pipes, such as sanitary sewer pipes, storm sewer pipes, water lines and gas lines, that are employed for conducting fluids frequently require repair due to fluid leakage. The leakage may be inward, from the environment into the interior or conducting part of the pipe, or outward, from the conducting part of the pipe into the surrounding environment. Leakage of this type may be due to improper initial installation of the pipe, deterioration of the pipe itself due to normal aging or to the effects of conveying corrosive or abrasive materials, cracking of the pipe or of pipe joints due to environmental conditions such as earthquakes, the movement of large vehicles or similar natural or man made vibrations, or any other such causes. Regardless of the cause, such leakage is undesirable and may result in waste of the fluid being conveyed by the pipe, in damage to the surrounding environment and in the possible creation of dangerous public health hazards.

Because of ever increasing labor and machinery costs, it is becoming increasingly more difficult and less economical to dig up and replace underground pipes, or portions or sections of such underground pipes, that may be leaking. As a result, various methods have been devised for the in situ repair or rehabilitation of the existing pipes, thereby avoiding the expenses and hazards associated with digging up and replacing the pipes or pipe sections. One of the more successful pipe repair or rehabilitation processes that is currently used is called the Insituform® Process and is described in U.S. Pat. Nos. 4,009,063; 4,064,211; and 4,135,958, the contents of all of which are incorporated by reference herein.

Briefly, in the Insituform Process, an elongated flexible tubular liner of a felt fabric, foam or similar resin impregnable material that has been impregnated with a thermosetting synthetic catalyzed resin is installed within the existing pipe. The impregnated liner may be pulled into the conduit by a rope or cable, and a fluid impermeable inflation bladder or tube is then everted within the liner. Generally, however, the liner is installed utilizing an inverting (or everting) process, as described in the latter two patents.

The flexible tubular liners generally have a smooth layer of relatively flexible, substantially impermeable material coating the outside of the liner in its initial state. This impermeable layer ends up on the inside of the liner after the liner is inverted. As the flexible liner is installed in place within the existing pipeline, the liner is pressurized from within, preferably utilizing a fluid such as water. The fluid forces the liner radially outwardly to engage and conform to the interior surface of the pipe. The resin is then cured to form a relatively hard, tight fitting, rigid pipe lining that effectively seals any cracks and that repairs any pipe or pipe joint deterioration in order to prevent further leakage either into or out of the pipe. The cured resin liner also serves to strengthen the existing pipe walls so as to provide added structural support.

More recently, there has been a demand for and a need to reline the lateral pipes as well as the mainlines. It is preferable to line the lateral pipeline using a lining tube of the same basic construction as the lining tube which is used for the main sewer pipe. A number of proposals for methods and apparatus have already been made in order to meet this requirement.

Because of the nature of the layout of main sewer pipe and laterals, it is preferable to be able to line the lateral from the mainline. This is referred to as lining from the inside out. A convenient method is to evert the lining tube into the lateral by a "launcher" type apparatus which is positioned inside the main sewer. The principal reason for proceeding in this way is that access to the lateral from the consumer point is inconvenient to the user. Frequently, users will object strongly to working for effecting lateral lining, from a position inside a dwelling or building. It is obviously much better if the contractor can perform the lining operation from inside the main sewer as the consumer is therefore in no way disturbed other than to have the service cut off for a short period while the lateral lining takes place.

Despite the existence of apparatus which are capable of installation of a lateral lining, these prior apparatus do not provide for the continued flow through of the main conduit or passageway. Often a bladder is used to forcingly mate the end of the newly installed lateral lining with the connection point of the lateral to the main conduit or passageway. The bladder expands when pressurized and fills the main conduit or passageway. Accordingly, when installation of a lateral lining is performed, the main passageway is blocked so that sewage and drainage from upstream cannot continue to progress through the main conduit or passageway.

Accordingly, it is desirable to provide an improved method and apparatus for the installation of cured in place lining of a lateral connection to a main conduit or passageway which overcomes these limitations.

SUMMARY OF THE INVENTION

Generally speaking, in accordance with the invention, an apparatus and improved method for everting a tube for rehabilitating an underground lateral sewer line are provided. The apparatus for installing a liner within a lateral service pipe connected to a main passageway includes a launching device which has an outer diameter smaller than the inner diameter of the main passageway, and a launch opening, is placed in the main passageway where the launch opening is aligned with the lateral passageway to be relined. The device includes an outer expandable/inflatable bladder which has an air hose connected to an air service at the open inlet to the main. When the launch device is in position and aligned with the lateral connection, the bladder can be expanded to hold the apparatus in place firmly. The lateral liner is formed with a flexible collar or flanged end which sits over the bladder at the launch opening. Thus, when the bladder is inflated the flanged end of the liner is held in place against the edge of the main passageway during the everting and curing process.

The launch device includes a hollow tubular elbow secured to the outer wall of the launch device and the other end at the inlet side of the device. This elbow provides a pressure path for the liner eversion. A flexible pressure hose is attached to the inlet end of the elbow and is used to hold the liner and a water source for eversion and curing during and after everting the liner into the lateral passageway.

Accordingly, it is an object of the invention to provide an improved apparatus for everting a tube or liner to line a lateral from the main line.

Another object of the invention is to provide an improved apparatus for everting a tube or liner into a lateral sewer line while providing for flow-through the main during installation.

Still another object of the invention is to provide an improved apparatus for everting a tube or liner into a lateral from the main line for providing an improved seal at the junction between the main and later.

A further object of the invention is to provide an improved method for everting a tube into a lateral from the main line.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and the arrangement of parts which are adapted to effect such steps and constructions, all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is an enlarged cross-sectional view of the liner of FIG. 5 as it is being inverted to show the position of the elements.

DESCRIPTION OF THE PREFERRED EMBODIMENT

Figure 1:
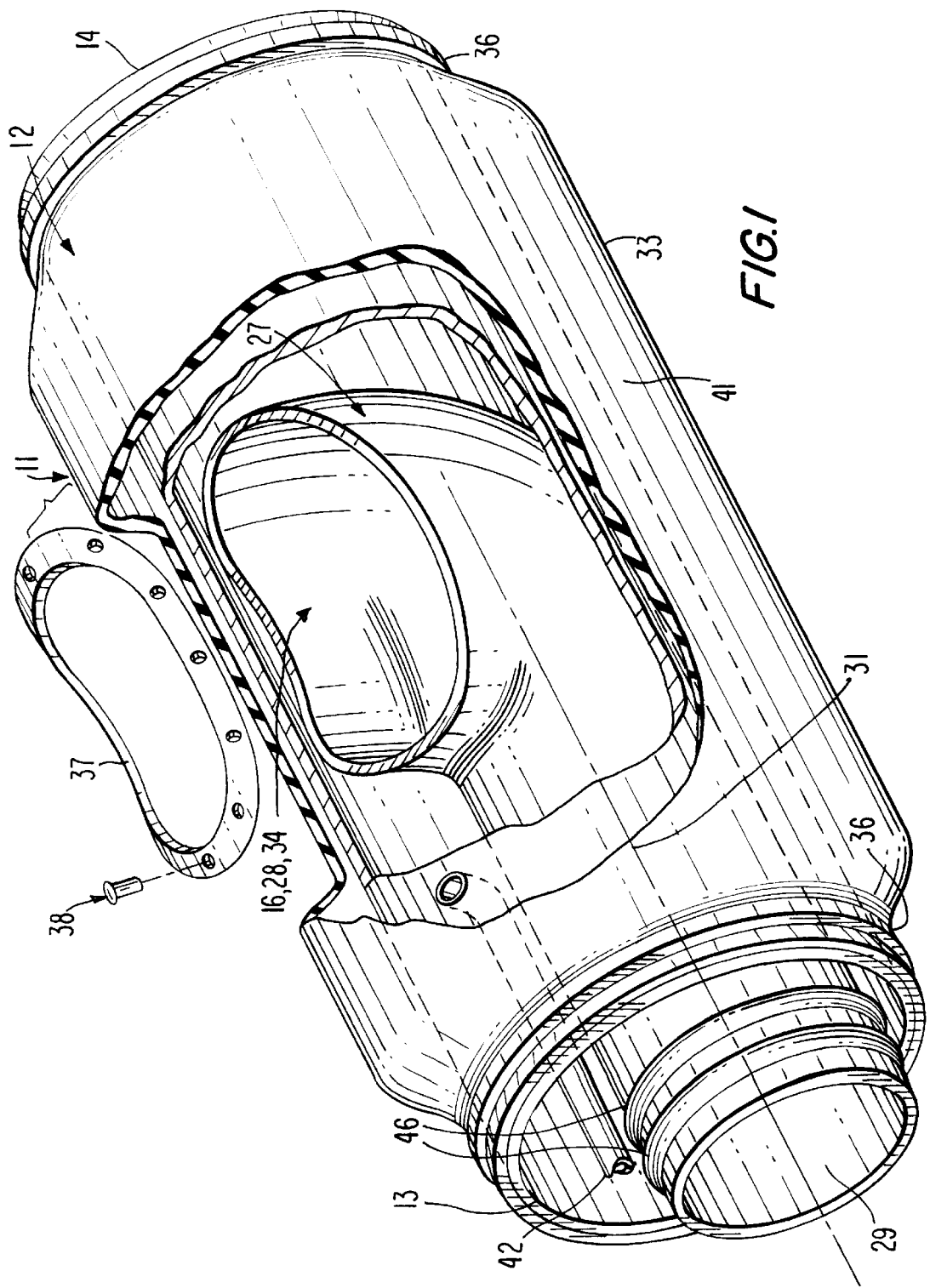
FIG. 1 is an exploded perspective view partially cut away of the flow through launcher device constructed and arranged in accordance with the invention.

FIG. 1 is an exploded perspective view partially cut-away showing a launching device for lining a lateral from the main identified generally as 11. Launching device 11 has a tubular body 12 with an outer diameter less smaller than the diameter of the main pipeline to permit passage of the device through a main line. Thus, the outer diameter of the tubular body 12 can vary depending on the size of the main passageway into which it is placed during an installation process. The outer diameter must be small enough to be easily inserted into the main passageway, but large enough so it can be anchored in place by expansion of a bladder during installation.

The eversion process requires a substantial amount of pressure to evert an impregnated liner. As an example, as discussed in U.S. Pat. No. 4,009,063 for METHOD OF LINING A PIPE and U.S. Pat. No. 4,064,211 for LINING OF PASSAGEWAYS, both to Eric Wood, the contents of which are incorporated herein by reference, the head of water required to evert an 8-inch liner is approximately 23 feet. Accordingly, if the tubular member is too small, the bladder will not as easily be able to hold the flange of the liner in place tightly during eversion without a much more substantial amount of air pressure supplied to inflate the bladder than otherwise.

Figure 5:
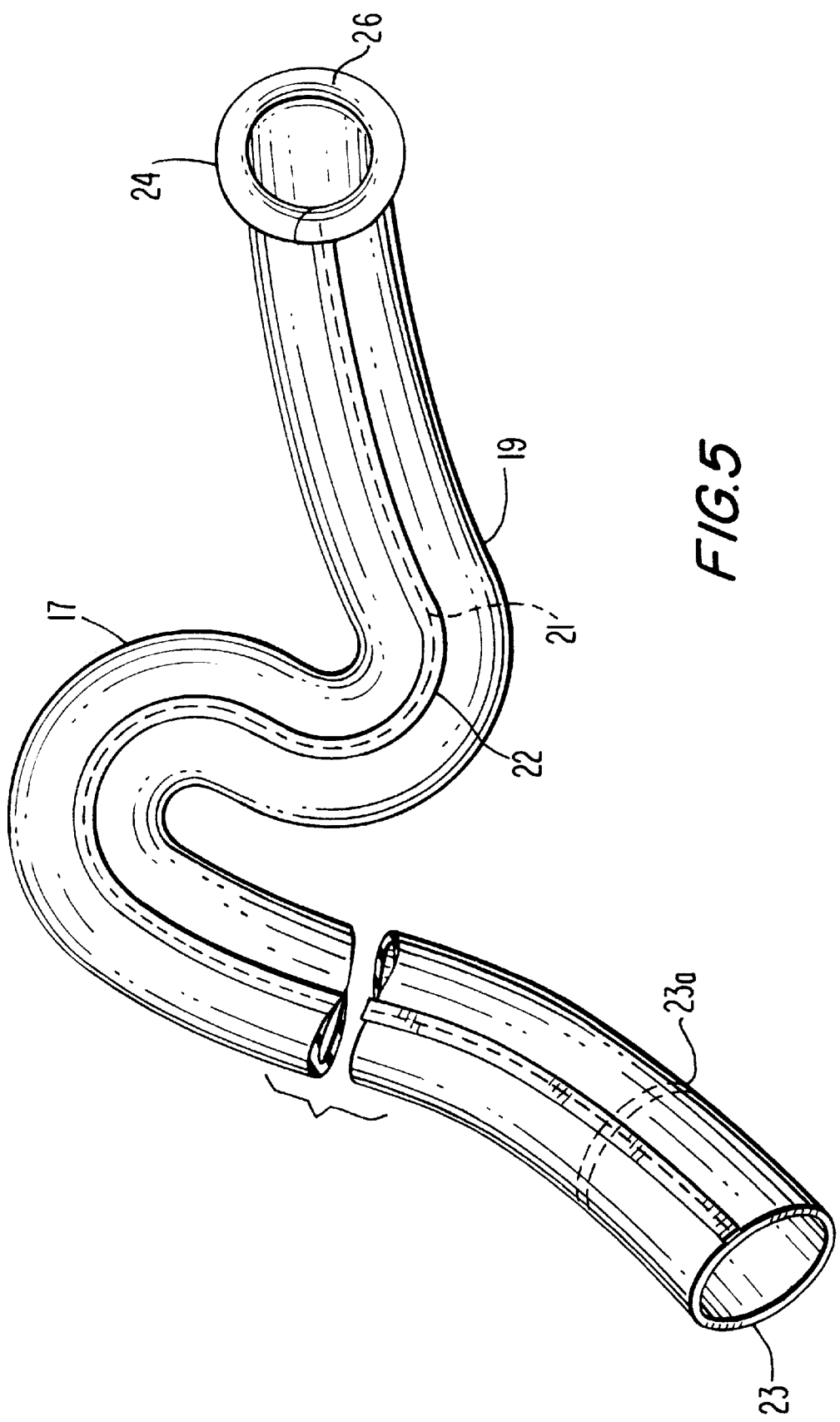
FIG. 5 is a perspective view of a flexible lining tube and collar suitable for use in the invention.

A flexible resin impregnated liner 17 for lining a lateral pipeline in accordance within invention is shown in FIGS. 5 and 6. Liner 17 is generally formed of fibrous material layer 18, such as a needled felt which has on the outer surface an impermeable film 19. Felt layer 18 and film 19 may be joined in sheet and are formed into tubular liners by stitching 21 which is covered with a sealing tape 22, as shown in FIG. 6, which is adhered by a solvent, such as tetrahydrofuran. An example of a process for manufacturing the furnished liner is shown in U.S. Pat. No. 4,446,181, the contents of which are incorporated herein by reference. Lateral liner 17 has an inlet end 23 and an opposite outlet or insertion end 24. Inlet end 23 will be inverted through a fibrous flange or collar 26 mounted at insertion end 24. Thus, after installation, the fluid carried by the lateral enters at inlet end 23 and passes out of outlet end 24 and flange 26 which is secured at the connection to the main line.

Tubular body 12 is formed of a rigid material, such as an iron or steel pipe and has an inlet end 13 at the side facing the inlet end of the main pipeline and an opposing outlet or downstream end 14. Tubular body 12 is also formed with a lateral or launching opening 16 is approximately the same size and shape as the opening in the main where the service lateral connects with the main passageway. Opening 16 preferably is smaller than the lateral opening so as to provide more surface area for contact with the lateral/main connection point. Fixedly mounted at opening 16 in tubular body 12 is a launch elbow. Elbow 27 forms generally an "L-shape" and has an elbow launch opening 28 and extends from opening 16 through inlet end 13 of body 12 to an inlet opening 29. Elbow 27 is hollow and has a lumen therethrough for receiving liner 17 and has an axis 31 substantially parallel to the axis of body 12. Elbow 27 at opening 28 is welded to body 12 at opening 16.

Figure 2:
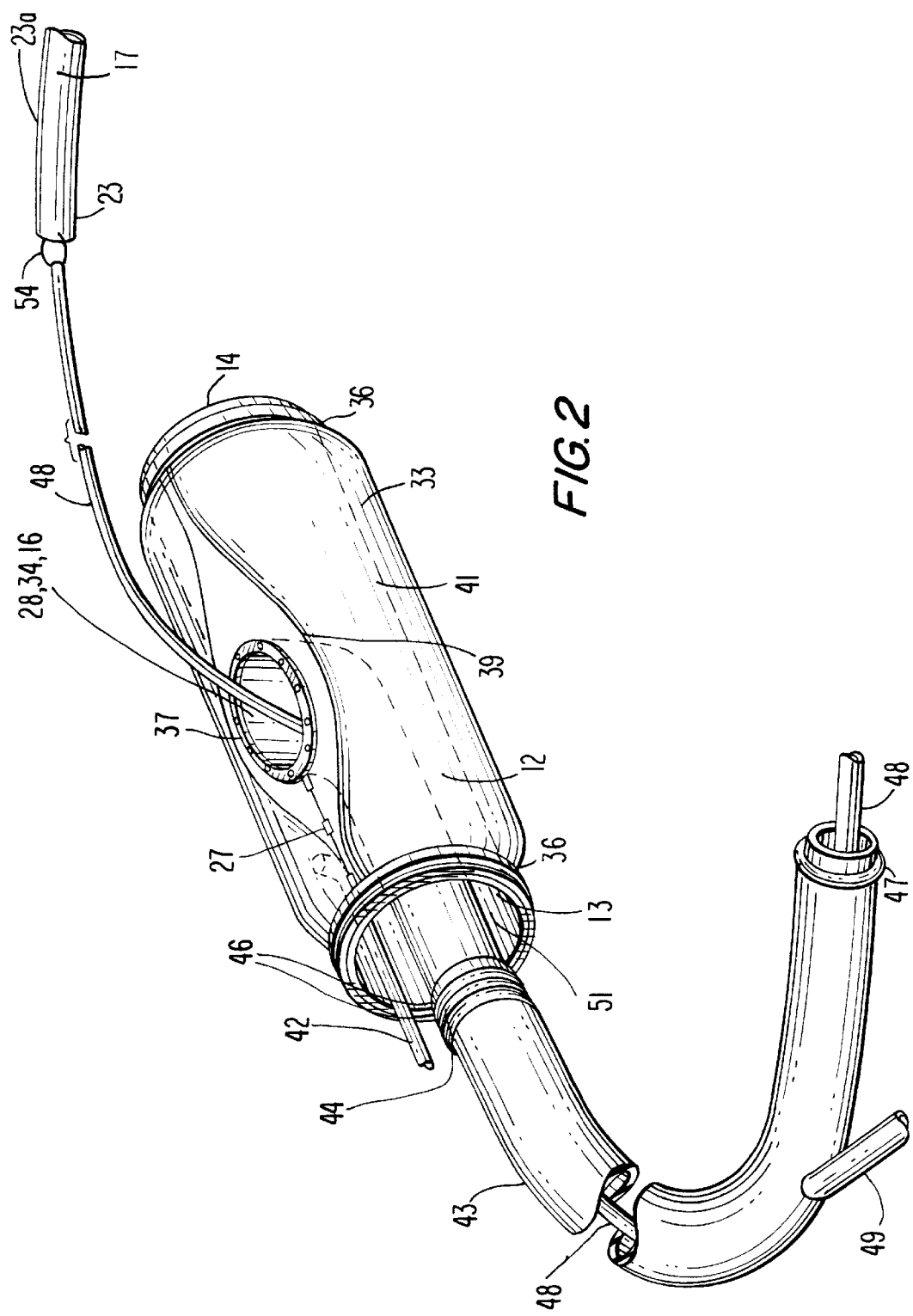
FIG. 2 is a perspective view of the flow through launcher of FIG. 1 showing the flexible carrier hose connected to the end portion of the elbow the water source being inserted therethrough.
Figure 4:
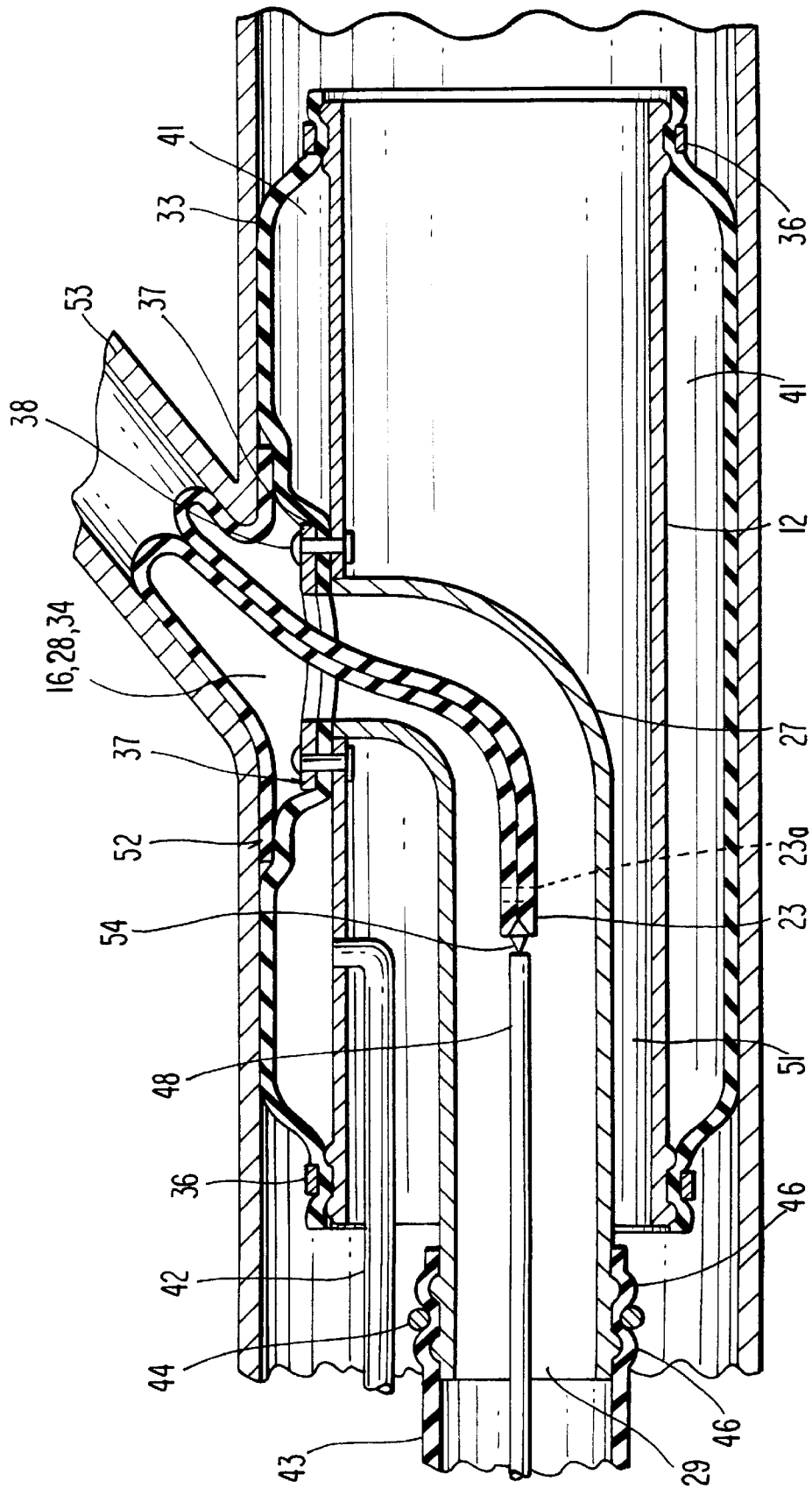
FIG. 4 is a side view of the flow through launcher of the invention after insertion into the main passageway and alignment with the lateral opening showing the bladder inflated and the liner being inverted.

Launching device 11 includes cylindrical flexible inflation bladder 33 which surrounds tubular body 12 and is formed with a cut-out opening 34. Inflation bladder 33 is attached to tubular body 12 at both ends 13, 14 by bands 36. It is understood that any means of attaching bladder 33 to ends 13, 14 can be used so that a seal at each end is provided. Opening 34 in bladder 33 corresponds to launch opening 16 in the side of the body 12 and to launch opening 28 in elbow 27. Bladder 33 in FIG. 1 is shown cut away to expose elbow launch opening 28. FIG. 2 shows tubular body 12 with inflation bladder 33 attached and with opening 34 in bladder 33 at opening 16 in body 11 by a retaining ring 37 secured by a plurality of screws 38. In the FIGS. 1, 2 and 4, cut-out opening 34, elbow opening 28 and body opening 16 are shown together as they coincide and coact with each other. FIG. 4 clearly shows the arrangement and interaction of the openings 16, 28, 34.

Figure 3:
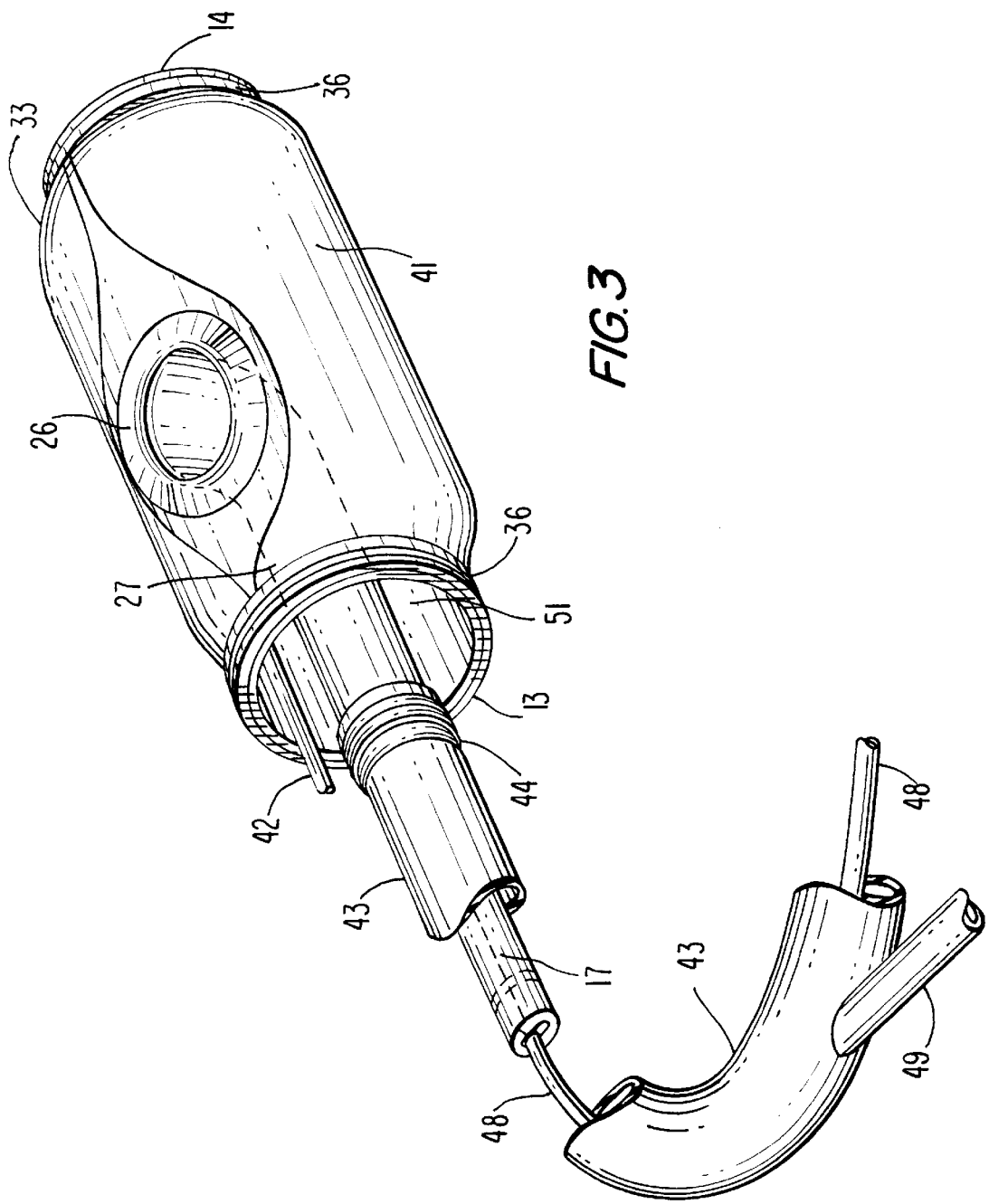
FIG. 3 is a perspective view of the flow through launcher of FIG. 1 showing the launcher fully loaded with the liner in place and ready for installation.

It is understood that inflation bladder 33 may suffer from abrasion, scuffs, cuts and general friction resulting from insertion and removal from the main passageway before and after the installation procedure. Accordingly, in a preferred construction, device 11 is fitted with a flexible skid 39, as shown in FIGS. 2 and 3, which covers the lower portion of device 11 but remains clear of opening 16. Skid 39 can be attached at the ends of body 12 in the same fashion as bladder 33 is attached and is readily replaced without having to open ring 37 and replace bladder 33. Skid 39 will not interfere with the expansion of bladder 33. Skid 39 can be made of any material, preferably a resilient rubber, that can withstand insertion into and removal from the main passageway. Since skid 39 is clear of the opening 16, the bladder 33 in the area of opening 16 will be free to operate in a manner so as to engage flange 26 of liner 17 against the passageway as described herein.

Bladder 33 is held in an air-tight manner against tubular body 12 at ends 13 14 by bands 36 and at opening 16 by retaining ring 37 to form a chamber 41. An air supply means (not shown) communicates with chamber 41 formed between inflation bladder 33 and body 12 by an air hose 42. Air supply hose 42 preferably is positioned in the space provided between the tubular body 12 and elbow 27 and extends therethrough far enough so that air can be supplied to expand bladder 33 once the apparatus is in place with launch opening 16 coincident with the lateral passageway opening.

In order to load liner in launching device 11, a flexible carrying hose 43 which is capable of holding pressure is attached to elbow inlet opening 29 by attaching means 44. In a preferred embodiment, elbow inlet opening is formed with ribs 46 which flexible carrying hose 43 is attached to the elbow 27 with an attaching means 44 being placed between ribs 46 as shown in FIG. 2, assist in securing hose 43 to prevent flexible carrying hose 43 from slipping off when it is pressurized during the installation process. Elbow 27 and carrying hose 43 form a pressure chamber.

The pressure chamber is preferably at least as long as liner 17 to be installed. This enables liner 17 to be pulled entirely within the pressure chamber when loading the apparatus with liner 17 prior to the installation process. When loaded only flange 26 of liner 17 protrudes or is outside tubular body 12 as shown in FIG. 3.

The inlet end of carrying hose 43 is formed with a packing gland 47 that allows recirculation hose 48 to pass therethrough. Recirculation hose 48 is attached to tail end 23 of liner 17. Recirculation hose 48 attached to liner 17 moves through gland 47 so that when flexible carrying hose 43 is pressurized and liner 17 inverts into the lateral passageway it will be pulled by tail end 23 of the liner 17 through flexible hose 43 and elbow 27 and into the lateral passageway during the installation process.

Recirculation hose 48 is constructed with a perforated end section (not shown) which allows for dual function. During the inversion process, the perforations will act as a release and allow excess air to escape through the hose so that the inside of the inverted liner is filled as fully as possible with pressurized fluid and air pockets will be substantially eliminated. Normally, tail end 23 ends up in a higher position relative to the rest of the inverted liner 17 during the installation process of a lateral passageway. Thus, any trapped air will travel up and toward the tail end 23 and escape through the perforations in the recirculation hose 48. Once the inversion is completed, the recirculation hose 48 is used to pump hot water into the inverted liner 17 to perform curing.

The proximal end of carrying hose 43 also includes a pressure opening 49 which enable use of fluid pressure inside the carrying hose 43 and elbow 27, the pressure chamber, to invert tube 17 up the lateral line. Gland 47 is designed so that it will allow recirculation hose 48 to pass through, but will maintain and hold the pressure in flexible carrying hose 43 which causes liner 17 to evert. The pressure hose 49 in the accompanying figures is attached downstream of gland 47. In another embodiment of the inventions, gland 47 is comprised of a substantially round disk at the proximal end of carrying hose 43. The disk will form a pressure seal at the proximal end and will have two holes, or inlets, provided. One inlet provides access to the interior of the carrying hose 43 for the recirculation hose 48 as previously described. The second inlet provides access to the interior of the carrying hose 43, and pressure chamber, for pressure hose 49. In a preferred embodiment, the disk is of the approximate diameter as the inlet end 29 of the elbow 27.

The elements of device 11 are assembled in such a manner that most of the annulus between the outer surface of elbow 27 and the inner wall of tubular body 12 is clear to create a flow-through channel 51. Formation of channel 51 allows for flow-through of the fluids therethrough normally carried by the main pipeline during installation of lateral lining 17.

Lining tube 17 is similar to the lining tube described in U.S. patent application Ser. No. 08/394,622 titled "Lateral Lining with Top Hat Collar" and incorporated herein by reference. Liner 17 may also include reinforcement means, such as a metal or plastic at the junction between the tubular fibrous material and the collar for sealing against the opening of the lateral. Liner 17, with or without a reinforcing ring, may include a detachable rope or cable end.

Generally, in a liner installation process, the resin-impregnated liner is placed adjacent the conduit to be lined, and the leading end of the liner is made to sealingly abut the proximal inside end of an eversion tube or pressure chamber in order to create a fluid seal. Fluid, such as water, then forces the liner to invert into the into the conduit. Various means have been provided for controlling the rate at which the liner inverts and is fed into the conduit. The typical means within the Insituform Process for controlling the "feed rate" of the liner is by restraining the trailing end of the resin-impregnated liner as it is everted into the conduit using a cable or a hold-back rope. By restraining the trailing or uneverted end of the liner, the liner does not evert too quickly, thereby ensuring that the liner unfolds properly while maintaining the pressure within the liner.

In addition to being restrained, the trailing end of the liner must also be sealed so that, when the tube is fully everted, the pressurized water or other fluid within the pipe is contained. At times, these pressures can be large. For example, the hold-back force needed during eversion of a 60-inch diameter liner tube with a 30-foot head of water is in excess of 20,000 pounds. When the tube is fully everted, the end of the liner must resist double that force.

Various means have been proposed to secure a hold-back rope or cable to the trailing end of the liner for restraining the trailing end of the liner and for distributing the pulling stress over the entire width of the end of the liner. It has been proposed to seal the liner at the point of attachment of the hold-back cable in order to prevent water from escaping through the uneverted end of the liner and penetrating into the resin-wet material of the uneverted and everted portions of the liner ahead. One such cable end seal is shown in U.S. Pat. No. 4,776,370, the contents of which are incorporated herein by reference.

As shown in FIG. 2, to install lateral liner 17, one first inserts recirculation hose 43 or a hold back rope through packing gland 47 through carrying hose 43 and elbow 27 and out launch opening 16. Recirculation hose 48 is then attached to detachable tail end 23 of liner 17. Recirculation hose 48 is then drawn back through elbow 27 until inner 17 is drawn fully into carrying hose 43. At this time, fibrous collar or flange 26 sits against inflation bladder 33. Flange 33 may be held in place on device 11 by rubber bands or any other suitable means which will release collar 26 when bladder 33 is inflated. Liner 17 is arranged so that impermeable layer 19 is on the outside and fibrous layer 18 has been fully impregnated with curable resin.

Referring now to FIG. 4, launching device 11 loaded with liner 17 in place within elbow 27 is shown in position in a mainline 52 for lining a lateral pipeline 53. Device 11 is shown with collar or flange 26 aligned with the lumen of service lateral 53. Pressure is applied to inflation bladder 33 so that collar 26 is pressed between bladder 33 and the interior wall of main pipeline 52. Pressure is then applied to the interior of carrier hose 43 and elbow 27 through pressure opening 49, causing liner 17 to evert into service lateral 53 through collar 26. As liner 17 everts into service lateral 53, recirculation hose 48, connected to tail end 23 of liner 17 by a coupling 54, is drawn through packing gland 47, carrier hose 43 and elbow 27 and through the portion of the interior of lateral liner which has been everted.

Once liner 17 has been fully everted into lateral passageway 53, liner 17 is in position to be cured. Recirculation hose 48 is then used to pump or transfer hot water into the interior of evert liner 17 thus causing the resin in liner 17 to cure. Impermeable coating 19 is now on the inside of liner 17 after inversion and contains the hot curing water. Impregnated fibrous material 18 is forced against the interior wall of lateral passageway 53. When liner 17 is cured, recirculation hose 48 is withdrawn through packing gland 47 to release detachable tail end 23 from lining tube 17. Pressure is then relieved in both carrier hose 43 and inflation bladder 33 and device 11 can be withdrawn from main pipeline 52.

During the time when the pressure is applied to the pressure chamber through carrying hose 43 and recirculation hose 48 is used to supply hot water to cure the resin in liner 17, liner 17 is closed at its distal, detachable tail end 23 to maintain pressure and contain the water. When the resin has sufficiently cured and pressure is relieved, the recirculation hose 48 can be withdrawn. Trailing end of liner 17 has been provided with an end which is attached to liner 17 sufficient to withstand the pressure applied during the eversion process, but which can be detached by application of a withdrawal force by pulling recirculation hose 48 without affecting the cured portion of liner 17 in lateral 53 to separate or fracture along seam 23a enabling removal of recirculation hose 48. A convenient manner for accomplishing this is disclosed in U.S. Pat. No. 5,044,405, the contents of which are incorporated herein by reference. Recirculation hose 48 is attached to end 23 of liner 17 by a coupling 54 which allows water to flow out of its perforated end but which also allows a removal force to be applied to hose 48 to detach tail end 23 from liner 17 for removal. At this time, tail end 23, attached to recirculation hose 48 detaches and can be pulled back through elbow 27 and flexible carrying hose 43.

The dimensions of tubular body 12 and elbow 27 are selected so that channel 51 is provided. While the lining operation is taking place and while the liner is curing, flow through the pipe continues in channel 51 between tubular body 12 and elbow 27. Accordingly, the invention provides several advantages. First, the main line flow does not have to be interrupted to accomplish the lining of the laterals. Second, a relatively simple apparatus is provided to accomplish this. In addition, the launching apparatus enables use of a lateral lining tube which has a resin impregnated fibrous collar which is securely pressed against the interior of the main line at the connection between the main and lateral for forming a lateral seal.

It will be seen that the objects set forth above, among those made apparent from the preceding description, are efficiently attained and, since certain changes may be made in carrying out the method and in the apparatus set forth without departing from the spirit and scope of the invention, it is intended that all matter contained in the above description and shown in the accompanying drawings shall be interpreted as illustrative and not in a limiting sense.

It is also to be under stood that the following claims are intended to cover all of the generic and specific features herein and described and all statements of the scope of the invention which, as a matter of language, might be said to fall therebetween.

What is claimed is:

1. An apparatus for lining a lateral conduit or passageway leading into a main conduit or passageway with a curable resin impregnated flexible liner from inside of the main conduit or passageway using a fluid medium under pressure to invert the liner while allowing normal flow of fluid through the main conduit or passageway during installation and cure, comprising:

a) a substantially rigid hollow tubular body with a proximal end and a distal end with an outer dimension less than the inner dimension of the main conduit or passageway and having a central axis and a lateral access opening radially disposed from the central axis for accessing a lateral conduit or passageway connected to the main conduit or passageway;

b) a pressure chamber, capable of holding pressure and having a dimension less than the inner dimension of the hollow tubular body, the pressure chamber formed by an elbow having a proximal end and a distal end with an opening at the distal end thereof mounted to the lateral access opening in the tubular body, and the proximal end extending substantially parallel to the central axis of the tubular body, an axial passageway being formed between the hollow tubular body and the pressure chamber to allow for normal flow of fluid through the main conduit or passageway, and a packing gland at the proximal end having a dimension less than the dimension of the main conduit or passageway allowing means for restraining the liner to pass therethrough while maintaining pressure in the pressure chamber;

c) a substantially cylindrical flexible inflation bladder disposed about the full circumference of the rigid tubular body, said bladder formed with an opening for cooperating with and aligned with the lateral access opening in the rigid tubular body with the bladder retained at both ends of the tubular body and at the lateral access opening of the rigid tubular body;

d) air supply means for providing air to inflate the bladder about the rigid tubular body for securely positioning the apparatus in a selected position in the main conduit or passageway; and e) a pressure source coupled to the pressure chamber to supply pressure to the inside of the elbow so as to invert an impregnated liner placed inside the elbow into the lateral conduit or passageway;

wherein the apparatus including the axial passageway between the tubular body and the pressure chamber allows fluid to flow through the hollow tubular body and main conduit or passageway during installation and curing of a lateral liner with the apparatus.

2. An apparatus for lining a lateral conduit or passageway leading into a main conduit or passageway with a curable resin impregnated flexible liner from inside of the main conduit or passageway using a fluid medium under pressure to invert the liner while allowing normal flow of fluid through the main conduit or passageway during installation and cure, comprising:

a) a substantially rigid hollow tubular body with a proximal end and a distal end with an outer dimension less than the inner dimension of the main conduit or passageway and having a central axis and a lateral access opening radially disposed from the central axis for accessing a lateral conduit or passageway connected to the main conduit or passageway;

b) a pressure chamber, capable of holding pressure and having a dimension less than the inner dimension of the hollow tubular body, the pressure chamber formed by an elbow pipe having a proximal end and a distal end with an opening at the distal end thereof mounted to the lateral access opening in the tubular body, and the proximal end extending parallel to the central axis of the tubular body, an axial passageway being formed between the hollow tubular body and the pressure chamber to allow for normal flow of fluid through the main conduit or passageway, and a flexible carrying hose having a distal end coupled to the proximal end of the elbow pipe and a packing gland having a dimension less than the dimension of the main conduit or passageway at the proximal end of the carrying hose for allowing the proximal end of the carrying hose to be located in the main conduit or passageway and for allowing maintenance of pressure in the carrying hose and pressure chamber and allowing means for restraining the liner to pass through the packing gland;

c) a substantially cylindrical flexible inflation bladder disposed about the full circumference of the rigid tubular body, said bladder formed with an opening for cooperating with and aligned with the lateral access opening in the rigid tubular body with the bladder retained at both ends of the tubular body and at the lateral access opening of the rigid tubular body;

d) air supply means for providing air to inflate the bladder about the rigid tubular body for securely positioning the apparatus in a selected position in the main conduit or passageway; and e) a pressure source coupled to the flexible carrying hose of the pressure chamber to supply pressure to the inside of the elbow pipe and carrying hose so as to invert an impregnated liner placed inside the elbow pipe and carrying hose into the lateral conduit or passageway;

wherein the apparatus including the axial passageway between the tubular body and the pressure chamber allows fluid to flow through the hollow tubular body and main conduit or passageway during installation and curing of a lateral liner with the apparatus.

3. The apparatus for lining a lateral conduit or passageway of claim 1, including straps at both ends of the body to form an air-tight seal between the bladder and the body.

4. The apparatus for lining a lateral conduit or passageway of claim 1, including a retaining ring for holding the bladder in place at the lateral access opening in an air-tight fashion.

5. The apparatus for lining a lateral conduit or passageway of claim 1, wherein the liner restraining means is a fluid pressure recirculation hose attachable to the trailing end of the impregnated liner.

6. The apparatus for lining a lateral conduit or passageway of claim 5, wherein the recirculation hose has a perforated end to allow efflux and influx of water and air.

7. The apparatus for lining a lateral conduit or passageway of claim 5, wherein the fluid pressure recirculation hose is for selectively supplying hot water for curing the resin.

8. The apparatus for lining a lateral conduit or passageway of claim 5, wherein said packing gland includes a circular disk through which the fluid pressure recirculation hose passes.

9. The apparatus for lining a lateral conduit or passageway of claim 1, wherein the distal end of the elbow pipe is affixed to the tubular body at the lateral access opening by welding.

10. The apparatus for lining a lateral conduit or passageway of claim 1, further including a flexible skid disposed over a portion of the tubular body and bladder, said skid providing protection for the bladder from friction resulting from insertion and removal of the apparatus during installation of an impregnated liner.

11. A method of lining a lateral conduit or passageway leading into a main conduit or passageway with a curable resin impregnated flexible liner having a collar of flexible fibrous material at one end and an opposite trailing end from the inside of the main conduit or passageway, while allowing normal flow of fluid through the main conduit or passageway during installation and cure, comprising:

attaching a restraining means to the trailing end of the liner and retracting the restraining means into a launching apparatus having;

a substantially rigid tubular body with a proximal end and a distal end with an outer dimension less than the inner dimension of the main conduit and having a central axis and a lateral access opening radially disposed from the central axis for accessing a lateral conduit or passageway connected to the main conduit or passageway;

a pressure chamber formed by an elbow, capable of holding pressure and having a dimension less than the inner dimension of the tubular body, the pressure chamber having an open end being a distal end and an opposite end being a proximal end, said open end affixed to the lateral access opening in the tubular body, and said opposite end having a packing gland for allowing the restraining means to pass therethrough, the opposite end disposed along the axis of the tubular body, an axial passageway being formed between the tubular body and the elbow to allow normal fluid flow through the main conduit or passageway during positioning and installation;

a substantially cylindrical flexible inflation bladder disposed about the full circumference of the rigid tubular body, said bladder formed with an opening for cooperating with and aligned to the lateral access opening in the rigid tubular body means for retaining the bladder at both ends of the tubular body and at the opening of the rigid tubular body; and air supply means for providing air to inflate the bladder;

pulling the restraining means into and through the pressure chamber via the packaging gland so that the liner is fully retracted into the pressure chamber and the collar is seated on the tubular body about the opening;

positioning the launching apparatus in the main conduit or passageway with the lateral access opening in the tubular body and collar opposite the lateral conduit or passageway opening;

allowing normal fluid to flow through the main conduit or passageway and axial passageway in the tubular body during positioning and installation;

applying pressure to inflate the inflation bladder to position the launching apparatus securely with the collar aligned with the lateral conduit or passageway opening;

applying an inversion pressure to the liner to cause the liner to evert through the collar into the lateral conduit or passageway;

curing the liner;

removing the trailing end of the cured liner; and removing the launching apparatus from the main conduit or passageway while continuing to allow normal fluid flow through the main conduit or passageway.

12. The method of lining a lateral conduit or passageway of claim 11, wherein the liner is formed with a friable end in the region of the trailing end, and after curing the friable end is torn away from the liner.

* * * * *